United States Patent [19]

Tsaur et al.

[11] Patent Number: 5,498,378
[45] Date of Patent: Mar. 12, 1996

[54] PROCESS FOR PREPARING CAPSULES WITH STRUCTURING AGENTS

[75] Inventors: Liang S. Tsaur, Norwood; Michael Slayton, Lodi, both of N.J.; Michael P. Aronson, West Nyack, N.Y.

[73] Assignee: Lever Brothers Company, Division of Conopco, Inc., New York, N.Y.

[21] Appl. No.: 152,114

[22] Filed: Nov. 12, 1993

[51] Int. Cl.⁶ .............................. B01J 13/04; B05D 7/00
[52] U.S. Cl. ................ 264/4.4; 252/174.13; 252/186.35; 252/186.36; 252/DIG. 1; 252/DIG. 10; 427/213.3; 427/213.36; 427/220; 428/402.2; 428/402.24

[58] Field of Search ............................ 264/4.4; 427/213.3, 427/213.36, 220; 428/402.2, 402.24; 252/174.13, 186.35, 186.36

[56] References Cited

U.S. PATENT DOCUMENTS

| | | | |
|---|---|---|---|
| 1,613,334 | 1/1927 | Symmes | 423/396 |
| 2,115,851 | 1/1935 | Handforth et al. | 159/48.1 |
| 3,161,602 | 12/1964 | Herbig et al. | 427/213.36 |
| 3,208,951 | 9/1965 | Berger et al. | 264/4.7 |
| 3,423,489 | 1/1969 | Arens et al. | 264/4 |
| 3,565,819 | 2/1971 | Gragger | 264/4.4 |
| 3,856,699 | 12/1974 | Miyano et al. | 427/2.15 |
| 3,956,401 | 5/1976 | Scardera et al. | 568/625 |
| 3,977,992 | 8/1976 | Hofacker | 264/4.4 X |
| 4,078,099 | 3/1978 | Mazzola | 427/213 |
| 4,126,717 | 11/1978 | Mazzola | 427/220 |
| 4,260,528 | 4/1981 | Fox et al. | 252/525 |
| 4,464,281 | 8/1984 | Rapisarda et al. | 252/174.21 |
| 4,675,236 | 6/1987 | Ohkawara et al. | 428/402.24 |
| 4,752,409 | 6/1988 | Drapier et al. | 252/94 |
| 4,824,593 | 4/1989 | Appel et al. | 264/4.4 X |
| 4,836,948 | 6/1989 | Corring | 252/99 |
| 4,859,358 | 8/1989 | Gabriel et al. | 252/99 |
| 4,919,841 | 4/1990 | Kamel et al. | 252/186.26 |
| 4,941,988 | 7/1990 | Wise | 252/99 |
| 4,973,419 | 11/1990 | Romeo et al. | 252/135 |
| 4,988,456 | 1/1991 | Takahashi et al. | 252/314 |
| 5,200,236 | 4/1993 | Lang et al. | 427/213 |
| 5,204,029 | 4/1993 | Morgan et al. | 264/4.4 |
| 5,230,822 | 7/1993 | Kamel et al. | 252/174.13 |

*Primary Examiner*—Richard D. Lovering
*Attorney, Agent, or Firm*—A. Kate Huffman

[57] ABSTRACT

This invention relates to wax capsules containing a structuring agent for encapsulation of an active material which is unstable in a liquid environment. The structuring agent is selected from the group of a hydrophobic silica, a hydrocarbon material and a molecular weight of about 50,000 to about 5,000,000 and an organophilic clay. The invention is especially useful for encapsulation of a surfactant. A process of making the capsules is also described.

9 Claims, No Drawings

1

PROCESS FOR PREPARING CAPSULES WITH STRUCTURING AGENTS

FIELD OF THE INVENTION

This invention relates to wax capsules containing a structuring agent for encapsulation of an active material, in particular, a surfactant, for use in liquid detergents, and a process of making such capsules. The actives which are encapsulated may be in any physical form.

BACKGROUND OF THE INVENTION

Liquid detergents, particularly for automatic dishwashing machines, have become increasingly popular. For such formulations, active materials which are unstable in an aqueous environment or in the presence of a bleaching agent are required, for example, nonionic surfactants are generally preferred to control foaming during the wash cycle and to reduce spotting and filming during the rinse cycle. However, many nonionic surfactants, especially those based on ethylene oxide/propylene oxide react readily with sodium hypochlorite. Many detergent formulators use either aqueous sodium hypochlorite or unencapsulated solid chloride forms and thus most nonionic surfactants are not compatible with the bleaching agent, especially in liquid formulations.

Attempts have been made to improve the compatibility of nonionics, especially alkoxylated nonionics with chlorine bleach, by "capping" the terminal hydroxyl group as described in U.S. Pat. Nos. 4,859,358 (Gabriel et al.); and 4,988,456 (Takahashi et al.).

Alternatively, the nononics and chlorine bleach may be compatibilized by separating the two into different compartments within a container and provide a means to combine them when dispensed for use or to encapsulate one of the materials.

Encapsulation of bleaches and nonionic surfactants is well known in the art as described in U.S. Pat. Nos. 3,856,699; 4,078,099; 4,126,717; 4,919,841 (Kamel et al.) and 5,200,236 (Langet al.). The described encapsulating processes include top spraying, fluidized bed and dispersion/solidification methods.

These described encapsulation processes as taught in the art may be effective in encapsulating certain actives such as a solid chlorine precursor but are not suitable for other actives such as surfactants, especially liquid nonionic surfactants. U.S. Pat. No. 5,200,236 issued to Langet al. teaches a process to encapsulate and effectively protect solid bleaches or nonionic surfactants by paraffin wax for liquid detergent application. This process is not suitable for those physical forms of actives which are not solid or easily agglomerated, such as liquids, flakes, small particles, etc. For example, a liquid active such as liquid surfactant has to be preabsorbed by more than twice its weight of solid carrier to become a solid which is then coated with wax by a fluidized bed method. This extra pregranulation process is costly and also limits the loading of a liquid active in the wax capsule.

U.S. Pat. No. 4,919,841 (Kamel) describes a dispersion and solidification process to make wax capsules. This process involves first dispersing the active core material into a molten wax at a temperature higher than the melting temperature of the wax, and then adding the active molten wax dispersion to an aqueous medium. The mixture is cooled to form the wax capsules. The described process is extremely difficult to use to encapsulate surfactants which are surface active molecules and tend to orient themselves at the oil/water interface. Poor trapping of surfactants by the wax capsule results when this process is used.

Thus, there is a need for a useful wax encapsulation process which is efficient in encapsulating solid or liquid actives for use in liquid cleaning products.

SUMMARY OF THE INVENTION

One object of the present invention is to provide a novel wax encapsulation process that is simple and efficient for encapsulating liquid or solid actives.

It is another object of the invention to provide wax capsules of actives which are stable and compatible in the presence of a bleaching agent, especially hypochlorite bleach containing liquid cleaning products.

The objects of the invention are accomplished by dispersing an active in a molten wax, containing a structuring agent, to form a stable active-in-molten wax dispersion. The stable active-in-molten wax dispersion is then atomized and cooled to form wax capsules.

The process of the invention is effective for encapsulating solid or liquid actives such as surfactants, enzymes or bleaches and is particularly useful when the actives are in liquid form.

DETAILED DESCRIPTION OF PREFERRED EMBODIMENTS

The encapsulating process of the invention comprises dispersing an active in a molten wax incorporating a structuring agent, and atomizing and cooling the active in the wax/structuring agent dispersion to form wax capsules.

The active in wax dispersion is preferably prepared by first homogeneously mixing a structuring agent into the molten wax at a temperature higher than the melting point of the wax. The active is then added to the molten wax mixture and mixed with a high shear mixer or homogenizer to form the active in a wax/structurant dispersion. The stability of the active in molten wax/structurant dispersion, which is controlled by the amount of structuring agent, is critical to the wax encapsulation process of this invention. Without a structuring agent, the actives, especially liquid actives, separate rapidly from the molten wax after mixing or during later steps of atomizing and cooling. This phase separation problem makes capsule preparation practically impossible and results in wax capsules with poor active entrapment.

Incorporating a structuring agent into the molten wax prevents the separation of active from the molten active after mixing or during storage of the active in a wax dispersion. More importantly, the incorporation of a structuring agent permits the preparation of the wax capsule by simple modifications of droplet formation or solidification methods known in the art.

Capsules prepared by the inventive process are about 100 microns to 3000 microns in diameter, preferably 500 to 2500 microns, most preferably 1000 to 1500 microns.

A particularly useful method of preparing the wax capsule of this invention is a modification of a spray cooling process described in U.S. Pat. Nos. 1,613,334 and 2,115,851. In this process, a spray nozzle or rotative disc atomizer is used to atomize the stable wax dispersion to form droplets of active in molten wax dispersion. These droplets then fall through a cooling tower and solidify to form wax capsules. The cooling tower can be cooled by applying either cooling air or cooling water in a co-current or counter-current flow.

The invention requires the presence of a structuring agent to produce stable capsules. Suitable structuring agents should be hydrophobic and readily mixable with the wax at a temperature higher than the melting point of the wax. At a level of less than about 8% by weight of the capsule composition, preferably less than about 5 wt. %, the structuring agent should prevent phase separation of the active from the molten wax and maintain stability of an active in a wax dispersion at a temperature higher than the melting point of the wax after mixing and during the processing of the capsule.

Examples of suitable structuring agents include relatively small hydrophobic solid particles such as hydrophobic silica or organophilic clay, and relatively high molecular weight hydrocarbons such as hydrocarbon rubber.

Hydrophobic silicas are silica particles with a hydrophobic group chemically attached to the surface of the particles. Silica particles can be hydrophobically modified with organic group such as silicone by treating the silica particles with a reactive organosilicon compound. Examples are Cab-O-Sil TS720 and TS530 available from Cabot Corporation and Aerosil 200 supplied by Degussa Corp.

The submicron hydrophobic fumed silicas such as those supplied by Cabot Co. under the trademarks Cab-O-Sil TS720 and TS530 are especially preferred.

Organophilic clays are hydrophobically modified clays which have organic ions replacing inorganic metal ions by ion exchange processes known in the art. These kinds of clay are readily mixable with organic solvent and have the capability to absorb organic solvent at the interlayers. Suitable examples of organophilic clays useful in the invention are Bentone SD-1, SD-2 and SD-3 from Rheox of Highstown, N.J.

High molecular weight hydrocarbons include homo- or copolymers of ethylene, propylene and butadiene having a molecular weight of about 50,000 to about 5,000,000. Suitable examples include Ortheleium® polyethylenepropylene elastomers supplied by DuPont Corporation.

The structuring agent should be present in an amount of about 0.5 to about 8% by weight of the capsule composition, preferably about 1 to about 4 wt %.

The wax coating materials should have a melting point in the range of between 40° C. and 70° C., preferably between 40° C. and 60° C., and should be present in an amount of about 80% to about 40% by weight of the capsule, preferably about 70% to about 60%. The wax coating can be a wax or a mixture of different waxes such as petroleum waxes, natural waxes or synthetic waxes. Petroleum waxes such as paraffin wax, microcrystalline wax and petrolatum are preferred.

Examples of suitable waxes for the invention which are commercially available include (1) paraffin wax such as Merck 7150, Merck 7151 supplied by E. Merck of Darmsteadt Germany; Boler 1397, Boler 1538 supplied by Boler of Wayne, Pa., and Ross 115/120 or 1365 supplied by Frank D. Ross Co. of Jersey City, N.J.; (2) Beeswax and (3) Japan Wax also supplied by Frank P. Ross Co., Inc., of New Jersey; and (4) Petrolatum waxes such as Petrolatum Pereco Snow or Petrolatum Penreco Ultima supplied by Penreco of Pennsylvania.

A blend of paraffin wax and petrolatum wax is preferred as the coating material especially for liquid actives, such as liquid nonionic surfactants. Paraffin waxes are highly crystallized materials. Without being limited by theory it is suspected that during the capsule formation of an active in molten paraffin wax dispersion the molten paraffin wax crystallizes and phase separates to form wax crystals rather than to form a complete and intact wax coating around the actives. Thus, the actives, especially liquid nonionic surfactants, tend to channel through the interstices of the wax crystals in the capsule and can diffuse rapidly out of the wax capsule once the capsule is added to a liquid cleaning formulation.

Incorporation of a structuring agent into a blend of petrolatum and paraffin wax further minimizes the channeling of liquid actives between wax crystals. Petrolatum wax is a semisolid waxy material consisting of hydrocarbon oils dispersed in microcrystalline waxes. It is hypothesized that during the capsule formation these hydrocarbon oils will locate between the interstices of wax crystals and work as an additional barrier to prevent the channeling of liquid actives in the wax capsule. The amount of petrolatum wax in the petrolatum/paraffin wax mixture should be in the range of 10 to 50 wt. %, preferably 20 to 40 wt. %.

Active Materials

The term "active materials" which may be encapsulated in the invention means those components which are unstable in the presence of a bleaching agent in liquid or humid environments or a bleaching agent which is unstable in an aqueous environment, in particular in an alkaline aqueous environment. All of these materials will lose activity without a wax coating according to the invention. The active materials within the scope of the invention include solid or liquid materials which are water soluble or water dispersible. Such core materials include bleach, enzymes, peracid precursors, bleach catalysts, perfume and surfactants.

The encapsulated active materials of the invention normally comprise 20% to 70%, preferably 35% to 45% by weight of the capsule.

Nonionic Surfactants

When nonionic surfactants are to be encapsulated, the surfactants should exhibit a hydrophilic/lipophilic balance value in the range of 1 to 10, preferably 3 to 7. The surfactants should further have a limited water solubility, low critical micelle concentration and low cloud point (less than 40° C.). Many nonionic surfactants are prepared by condensation of alkyl or aromatic alcohols with ethylene oxide and propylene oxide in ratios which result in HLB values in the desired range.

Examples of nonionic surfactants suitable for the invention include: polyoxyethylene and/or polyoxypropylene condensates of aliphatic carboxylic acids, aliphatic alcohols and alkyl phenols; polyoxyethylene derivatives of sorbitan mono-, di-, and tri-fatty acid esters and polyoxyethylene polyoxypropylene block polymers as described in U.S. Pat. No. 4,973,419, herein incorporated by reference.

Specific nonionic compounds include those having the formula:

$$R_1O—(CH_2[CH_3]O)_n(CH_2CH_2O)—Z$$

wherein:
$R_1$ is an alkyl chain having from $C_6$–$C_{12}$ carbons in either branched or linear form or cycloalkyl;
n=1 to 30;
m=1 to 30;
Z= hydrogen, a lower alkyl having up to 3 carbons or a halide ion.

Preferred alkoxylated nonionics are those which are capped by a terminal hydroxyl group as described in U.S. Pat. Nos. 4,859,358 (Gabriel et al.) and 4,988,456 (Takahashi et al.), herein incorporated by reference.

Particularly preferred are those alkoxylated nonionics described in U.S. Pat. No. 3,956,401 owned by Olin Corporation. Preferred defoaming nonionics include those described in U.S. Pat. No. 4,973,419, herein incorporated by reference. An especially preferred nonionic is an alkoxylated surfactant having 7 to 10 EOs supplied by Olin Chemical Company of Hartford, Connecticut under the trademark Polytergent SLF-18.

Nonionic surfactants are generally used in automatic dishwashing detergents in an amount of from about 0.2 to about 8 wt. %, preferably from about 1 to about 4 wt. %.

In the capsules of the invention, the nonionic is present in an amount of from about 20 to about 70 wt. %, preferably about 35 to about 45 wt. % of the capsule.

Anionic Surfactant Actives

Anionic surfactants may also be encapsulated by the process of the invention to be used as cosurfactants with the nonionics described above. Alkyl ethoxycarboxylates are particularly preferred for formulation.

It is to be understood that if it is the anionic surfactant which is encapsulated, the nonionic surfactant or the chlorine bleach needs to be compatibilized both together and with the anionic. In the preferred embodiment, the nonionic surfactant is encapsulated in the same manner as the anionic surfactant.

It is known that compositions containing a mixture of nonionic/anionic costructurants become more stable as the nonionic/anionic ratio increases. Anionics which are suitable for use in the invention include sodium dodecylsulfate, sodium dodecylsulfonate, sodium decylsulfonate, sodium dodecylcarboxylate, sodium hexadecylcarboxylate, alkyl ether carboxylate, and sodium diphenyloxide disulfonate.

Bleach

A wide variety of halogen and peroxygen bleach sources may be used in the present invention. Among suitable halogen donor bleaches are heterocyclic N-bromo and N-chloro imides such as trichlorocyanuric, tribromocyanuric, dibromo and dichlorocyanuric acids, and salts thereof with water solubilizing cations such as potassium and sodium. An example of the hydrated dichlorocyanuric acid is Clearon CDB56, a product manufactured by the Olin Corp., Cheshire, Conn. Such bleaching agents may be employed in admixtures comprising two or more distinct chlorine donors. An example of a commercial mixed system is one available from the Monsanto Chemical Company under the trademark designation "ACL-66" (ACL signifying "available chlorine" and the numerical designation "66", indicating the parts per pound of available chlorine) which comprises a mixture of potassium dichloroisocyanurate (4 parts) and trichloroisocyanurate acid (1 part).

Dry, particulate, water-soluble anhydrous inorganic salts are likewise suitable for use herein such as lithium, sodium or calcium hypochlorite and hypobromite. Sodium hypochlorite is preferred for liquid formulations.

Other chlorinating agents include potassium and sodium dichloroisocyanurate dihydrate, chlorinated trisodium phosphate and calcium hypochlorite. Particularly preferred are sodium or potassium dichloroisocyanurate dihydrate. Preferred concentrations of all of these materials should be such that they provide about 0.2 to about 1.5% available chlorine. Hypohalite liberating compounds may generally be employed in automatic dishwashing detergents at a level of from 0.5 to 5% by weight, preferably from 0.5 to 3%.

Suitable chlorine-releasing agents are also disclosed in the ACS monograph entitled "Chlorine-Its Manufacture, Properties and Uses" by Sconce, published by Reinhold in 1962, incorporated herein by reference.

Chlorine bleach sources of the present invention may be paraffin wax capsules as disclosed in Lang et al. (U.S. Pat. No. 5,200,236).

The bleach source may also be encapsulated by the fluidized bed process disclosed in U.S. Pat. No. 5,200,236 issued to Lang et al., herein incorporated by reference. Particularly preferred chlorine bleach sources include potassium and sodium dichloroisocyanurate dihydrate. The bleach source should be present at a level which provides about 0.2 to about 2.0% available chlorine. Hypohalite liberating compounds may also be employed in the dishwashing detergents on the invention at a level of from about 0.5 to 5% by weight, preferably from 0.5 to 3%.

Organic peroxy acids and diacyl peroxides may be utilized as the bleach core. The peroxy acids usable in the present invention are solid compounds and substantially stable in the temperature range of about 40° C. to about 50° C.

Typical monoperoxy acids useful herein include alkyl peroxy acids and aryl peroxy acids such as:

(i) peroxybenzoic acid and ring-substituted peroxybenzoic acids, e.g. peroxy-alphanaphthoic acid, and magnesium monoperphthalate;

(ii) aliphatic and substituted aliphatic monoperoxy acids, e.g., peroxylauric acid, peroxystearic acid, 6-(N-phthalimido )peroxyhexanoic acid, o-carboxybenzamido peroxyhexanoic acid, N-nonenylamidoperadic acid and N-nonenylamidopersuccinic acid.

Typical diperoxy acids useful herein include alkyl diperoxy acids and aryldiperoxy acids, such as:

(iii) 1,1 2-diperoxydodecanedioic acid;

(iv) 1,9-diperoxyazelaic acid;

(v) diperoxybrassylic acid; diperoxysebacic acid and diperoxyisophthalic acid;

(vi) 2-decyldiperoxybutane-1,4-dioic acid.

A typical diacylperoxide useful herein includes dibenzoylperoxide.

Inorganic peroxygen compounds may also be suitable as cores for the particles of the present invention. Examples of these materials are salts of monopersulfate, perborate monohydrate, perborate tetrahydrate, and percarbonate.

Silicates

Alkaline metal silicates are employed as cleaning ingredients, as a source of alkalinity, metal corrosion inhibitor and protector of overglaze on china tableware. An especially preferred silicate is sodium silicate having a ratio of $SiO_2:Na_2O$ of from about 1.0 to about 3.3, preferably from about 2 to about 3.2. While potassium silicate may be used in detergent formulations to provide an additional source of potassium ion to maintain homogeneity, sodium silicate is preferred since it is more effective. Accordingly, sodium silicate is preferably used in the invention in either a solid or aqueous form, at a level in the range of about 2 to about 20%, more preferably from about 3 to about 15%.

Thickeners and Stabilizers

Thickeners for use in the homogeneous compositions according to the invention are disclosed in U.S. Pat. No. 4,836,948 (Corring) herein incorporated by reference. Particularly preferred thickeners are the cross-linked polymers having molecular weights ranging from about 500,000 to about ten million, preferably between 500,000 and 4,000,000. Examples of commercially available cross linked polymers are the Carbopol® resins manufactured by the B.F. Goodrich Chemical Company. These material include Carbopol 941® (m.w. 1,250,000) Carbopol 934® (m.w. 3,000,000), Carbopol 940® (m.w. 4,000,000) and Carbopol 617® (m.w. 4,000,000). Analogs provided by other manufacturers would also be useful. In the preferred embodiments, the chlorine bleach is encapsulated, thus polymers such as these disclosed in U.S. Pat. No. 4,260,528 (Fox et al.) may also be used.

The thickening polymer is present in the compositions in a range of 0 to about 3.0 by wt. % and preferably about 0.4% to about 1.5% by wt.

Co-structurants or stabilizers may also be used in combination with the thickeners. Examples of such preferred co-structurants and stabilizers include (1) alumina described in U.S. Pat. No. 4,836,948, (2) alkali metal silico aluminate described in U.S. Pat. No. 4,941,988, (3) polyvalent metal soaps, described in U.S. Pat. No. 4,752,409 (Drapier, et al.) and (4) a synthetic hectorite clay such as Laponite XLS supplied by Waverly Mineral Products Co., subsidiary of LaPorte, Inc., of Bala Cynwd, Pa. 19004.

Preferred constructurants include alumina and the hectorite clays. The constructurants may be used in a range of from about 0.005 to 1%; preferably about 0.01 to about 0.5%; and especially preferred about 0.01 to about 0.1%.

Enzymes

Enzymes which are capable of facilitating removal of soils from a substrate are also suitable cores for the particle of the present invention. Such enzymes include proteases (e.g., Alcalase®, Savinase® and Esperase® from Novo Industries A/S), amylases (e.g. Termamyl® from Novo Industries A/S), lipases (e.g., Lipolase® from Novo Industries A/S) and oxidases.

Optional Ingredients

Bleach stable colorants such as Direct Yellow 28 and others disclosed in co-pending patent application Ser. No. 348,549, allowed Aug. 9, 1991, and now U.S. Pat. No. 5,089,162, may be used in the present invention. Bleach sensitive dyes such as these described in U.S. Pat. No. 4,464,281 (Rapisarda, et al.) may also be used in the preferred embodiments containing encapsulated bleach. Alternatively, pigments such as Ultramarine Blue 5151 or Ultramarine Blue 17 may also be used. Greater latitude in the selection of perfume ingredients is provided because destabilization by chlorine is not a factor. If additional defoaming is desired, silicones such as a polydimethyl siloxane with 6% hydrophobed silica supplied as Antifoam DB-100® by Dow Corning of Midland, Mich. may be used. Minor amounts of other ingredients such as anti-tarnish agents, soil suspending agents, hydrotropes, etc. may also be included in the inventive formulations. The amount of each optional additive is no greater then about 0.5% by weight.

The following examples will serve to distinguish this invention from the prior art, and illustrate its embodiments more fully. Unless otherwise indicated, all parts, percentages and proportions referred to are by weight.

EXAMPLE 1

This example illustrates the advantage of incorporating a structuring agent into the capsule composition. The following four types of capsules containing a nonionic surfactant were prepared:

TABLE 1

|  | Capsule 1 | Capsule 2 | Capsule 3 | Capsule 4 |
|---|---|---|---|---|
| 70% Paraffin wax/30% petrolatum wax[1] | 56.4% | 51% | 54% | 60% |
| SLF-18[2] | 38% | 38% | 38% | 38% |
| Brij 78[3] | 2% | 2% | 2% | 2% |
| Acid Red 4 Dye | 0.02% | 0.02% | 0.02% | 0.02% |
| Structuring Agent | — | — | — | None |
| Hydrophobic Silica TS 720[4] | 3.6% | — | — | — |
| Hydrocarbon Rubber[5] | — | 9% | — | — |
| Organophilic Clay[6] | — | — | 6% | — |

[1]The paraffin wax is S.P.1275 supplied by Strahl & Pitsch, Inc. of West Babylon, New York. Petrolatum is a microcrystalline wax and paraffin oil supplied by Penreco of Karns City, Pennsylvania.
[2]SLF-18 is a Polytergent nonionic surfactant supplied by Olin Company of Hartford, Connecticut.
[3]Brij 78 is an ethoxylated alcohol nonionic surfactant supplied by ICI Co. of Wilmington, Delaware.
[4]Fumed silica supplied by Cabot Company.
[5]Hydrocarbon rubber from Du Pont.
[6]Organophilic clay is Benton SD-1 from Rheox of New Jersey.

Capsule Preparation

Capsules were prepared by first dispersing the surfactant active in molten wax using a structuring agent to form a stable active in wax dispersion at 80°–85° C. The dispersion was carried out using a high shear mixer (RW 20 DZM, Tekmar) at 1000 rpm for one hour. The stable dispersion was then further emulsified using a sonicator Wibra-cell, Sonics & Materials) at 40 to 50 output for 5 to 7 mitres. Capsules were formed by dispensing the stable dispersion from a heated Pasteur pipet (2 mL) onto a glass surface chilled with dry ice. Capsule size was about 1 to 2 min.

Evaluation of Capsule Performance

The performance of the four capsule types was evaluated by measuring the chlorine available from sodium hypochlorite (Sunnysol 150, Jones Chemicals) solutions containing a fixed level of capsules over time. The surfactant capsules were placed in 50 ml of hypochlorite solutions containing 1% available chlorine in distilled deionized water at room temperature and 37° C. The capsules were dosed to the liquid solution to give a concentration of 1% surfactant per sample. The percentage of available chlorine was determined with a Brinkmann Auto Titrator using the Kl/thiosulfate method.

During preparation it was observed that capsules 1, 2 and 3 containing the structuring agents, (hydrophobic silica particles, hydrocarbon rubber and hydrophilic clay) were easy to process and displayed a rather rigid appearance. The sample with no structuring agent (capsule 4) rapidly phase separated. Although attempts were made to form capsules by cooling the unstable dispersion, the results were largely unsuccessful. The capsules (4) formed had a "tacky" appearance due to the presence of surfactant on the capsule surface.

EXAMPLE 2

Capsules 1, 2 and 3 were evaluated in a 1% hypochlorite solution as described in the evaluation of capsule performance section of Example 1. A sample containing 1 wt. % of nonencapsulated SLF-18 nonionic surfactant was also evaluated for comparison. The performance of these three capsule types and the nonencapsulated SLF 18 in the hypochlorite solution is summarized in the following Table 1:

TABLE 2

| CAPSULES | 1% HYPOCHLORITE SOLUTION HALF-LIFE AT ROOM TEMPERATURE | 1% HYPO-CHLORITE SOLUTION HALF-LIFE AT 37° C. |
|---|---|---|
| Nonencapsulated SLF-18 | 7 to 10 days | 1 to 3 days |
| Capsule 1 | 56 to 64 days | 21 to 28 days |
| Capsule 2 | 35 to 42 days | 10 days |
| Capsule 3 | 35 to 45 days | 7 to 10 days |

Hydrophobic silica used as a structuring agent provided capsules which were observed to be the most stable. Hydrocarbon rubber and organophilic clay as structuring agents were also observed to superior performance to that of the nonencapsulated SLF-18 and were stable at room temperature for more than 35 days.

EXAMPLE 3

Four capsule types containing various paraffin wax to petrolatum wax ratios were prepared as shown:

TABLE 3

| CAPSULE INGREDIENTS | % BY WEIGHT |
|---|---|
| Paraffin wax/Petrolatum wax[1] | 56.40 |
| Hydrophobic silica[2] | 3.60 |
| SLF-18[3] | 39.20 |
| Stearic acid | 0.80 |
| Acid Red 4 Dye | 0.02 |

[1]The paraffin wax is Boler 1397 supplied by Frank D. Ross Company, Inc., of Jersey City, New Jersey. Petrolatum is supplied by Penreco of Karns City, Pennsylvania.
[2]Fumed silica supplied by Cabot Company.
[3]SLF-18 is a Polytergent nonionic surfactant supplied by Olin Company of Hartford, Connecticut.

The paraffin wax/petrolatum ratios were varied from 100/0, 90/10, 70/30 and 40/60.

The four types of capsules were introduced into a 1 wt. % hypochlorite solution at a pH of 11.9 (unbuffered) and the nonionic agent was observed for its half-life at room temperature and at 37° C. with the following results:

TABLE 4

| RATIO % Paraffin wax/Petrolatum ratio) | HALF-LIFE AT ROOM TEMPERATURE | HALF-LIFE AT 37° C. |
|---|---|---|
| 100/0 | <14 days | <14 days |
| 90/10 | <14 days | <14 days |
| 70/30 | 67 days | 9 to 12 days |
| 40/60 | 85 days | <14 days |

It was observed that the capsules exhibiting the greatest stability were these wherein the paraffin wax to petrolatum wax ratio was 70:30. Capsules with a paraffin wax to petrolatum ratio of 40:60 were relatively stable at room temperature, however, their high petrolatum content made them difficult to process.

EXAMPLE 4

Three capsule samples having a 70% paraffin wax to 30% petrolatum wax ratio were prepared by varying the types of surfactant as follows:

TABLE 5

| CAPSULE INGREDIENTS | CAPSULE 1 | CAPSULE 2 | CAPSULE 3 |
|---|---|---|---|
| 70% Paraffin Wax/30% Petrolatum[1] | 56.40% | 56.40% | 56.40% |
| Hydrophobic silica TS720 | 3.60% | 3.60% | <3.60% |
| Acid Red 4 Dye | 0.02% | 0.02% | 0.02% |
| Surfactant | | | |
| Brij 78 | 40% | — | — |
| SLF-18 | — | 40% | — |
| Tergitol-115S40 | — | — | 40% |

[1]Brij 78 is a alcohol nonionic surfactant supplied by ICI Company of Wilmington, Delaware.
[2]SLF-18 is a Polytergent nonionic surfactant supplied by Olin Company of Hartford, Connecticut.
[3]Tergitol 15S40 is an ethoxylated alcohol nonionic surfactant supplied by Union Carbide of Danbury, Connecticut.

Capsule stability was tested as described in Example 1 and the following results were observed:

TABLE 6

| | SURFACTANT | HALF-LIFE AT ROOM TEMPERATURE | HALF-LIFE AT 37° C. |
|---|---|---|---|
| Capsule 1 | BRIJ 76[1] | 1 to 4 days | 1 to 4 days |
| Capsule 2 | SLF-18[3] | 98 to 108 days | 35 to 42 days |
| Capsule 3 | Tergitol 15S40[3] | 1 to 4 days | 7 to 11 days |

Capsules exhibiting the greatest stability in hypochlorite solution were those containing the nonionic surfactant SLF-18, which has an HLB value of 3.5.

Capsules containing the surfactants BRIJ 76 and Tergitol 15S40 were extremely unstable in the hypochlorite solution. Both surfactants have HLB values of greater than 10.

Therefore, it was observed that surfactants exhibiting an HLB value of less than 10 provide capsules which are more bleach resistant than those having surfactants with HLB values of greater than 10.

EXAMPLE 5

The capsule 1 type of Example 1 was added to a commercially available automatic dishwashing liquid (ADL) having the following formula:

TABLE 7

| INGREDIENTS | % ACTIVES |
|---|---|
| Carbopol 940[1] | 0.70 |
| Sulfuric Acid | 0.004 |
| Smectite Clay | 0.02 |
| Sodium Tripolyphosphate | 16.0 |
| Sodium Silicate (2.4 ratio) | 15.0 |

TABLE 7-continued

| INGREDIENTS | % ACTIVES |
|---|---|
| Sodium Hydroxide | 1.2 |
| Sodium Hypochlorite | 1.00 |
| Optional Ingredients | 0.20 |
| Water | to 100% |

[1] A polymer thickener supplied by B. F. Goodrich, Co.

The stability of the encapsulated nonionic surfactant in the automatic dishwashing detergent composition was observed as follows:

TABLE 7

| FORMULATIONS | HALF-LIFE AT ROOM TEMPERATURE | HALF-LIFE AT 37° C. |
|---|---|---|
| ADL with 45.3% Capsule 1 of Example 1 | 101 to 123 days | 42 days |
| ADL containing 2% non-encapsulated nonionic surfactant | 7 to 10 days | 3 to 7 days |

It was observed that nonencapsulated nonionic surfactant was bleach resistant at room temperature for only up to about 10 days. In the same formulation, when the nonionic was encapsulated according to the invention, bleach resistance increased at room temperature to 101 to 123 days.

EXAMPLE 6

Capsule 1 type of Example 1 were evaluated for performance in the wash using a 12 wash spotting and filming test. Samples of the automatic dishwash liquid with the formula shown in Example 5 and the commercial product with 1.5% nonencapsulated nonionic surfactant were used as the controls. The results provided the Table below and indicate that the capsules released SLF-18 effectively and performed comparably to the commercial product with 1.5% nonencapsulated nonionic surfactant.

TABLE 9

| | SPOTTING-SCORE | FILMING-SCORE |
|---|---|---|
| ADL Alone | 3.1 | 2.8 |
| ADL with 1.5% nonencapsulated nonionic surfactant | 1.0 | 2.4 |
| ADL with encapsulated nonionic surfactant | 1.0 | 1.7 |

*NOTE: The scale is a 5-point scale with 0 being the best and 5 being the worst
Test conditions were as follows:
Water hardness: 120 ppm perm. and 180 ppm Bicarbonate hardness
Machine used: Kenmore, Normal Cycle
Dose: 40 gm per wash
Surfactant dosed at 1.5% level

EXAMPLE 7

The following example describes the preparation of a solid chlorine bleach active dispersed in a wax matrix. The composition of these capsules is as follows:

TABLE 10

| CAPSULE INGREDIENTS | % BY WEIGHT |
|---|---|
| Paraffin wax/Petrolatum[1] | 56.40 |
| Hydrophobic silica[2] | 3.60 |
| CDB-56 ® | 40.00 |

[1] The paraffin wax is S.P. 1275 supplied by Strahl & Pitsch, Inc. of West Babylon, New York. Petrolatum is a microcrystalline wax and paraffin oil supplied by Penreco of Karns, City, Pennsylvania.
[2] Fumed silica is supplied by Cabot Company.
[3] CDB-56 ® is potassium dichloroisocyanurate supplied by Olin Company of Hartford, Connecticut.

The capsules were prepared by first dispersing a chlorine bleach active (CDB-56®, supplied by Olin) in molten wax using the structuring agent Cab-O-Sil TS720, supplied by Cabot, to form a stable active in wax dispersion. A Dispermat® (VMA-Getzmann) device operated at 3000 rpm for 2 to 5 minutes was used to disperse the materials. The internal temperature of the wax mixture was maintained at 60°–65° C. so that cooling to or below the wax melting point did not occur when the active was added or during the dispersion or homogenization step. The stable dispersion was then atomized at 3000 rpm for 30 minutes using the Dispermat® device. Capsules were formed by manually dispensing the stable dispersion from a heated Pasteur pipet (2 mL) onto a glass surface chilled with dry ice. The resulting capsules had a diameter of about 1 to 3 min.

The formed chlorine bleach capsules were placed in an automatic dishwashing detergent whose base formula is provided in Table 11. A control sample of 1% CDB-56® dry chlorinating compound was also evaluated. Samples were stored at room temperature and 35° C. Stability was evaluated by measuring the available chlorine with a Brinkmann Auto Titrator using a Kl/thiosulfate method.

TABLE 11

| MATERIAL | % WEIGHT |
|---|---|
| Carbopol 940 | 0.80 |
| Laponite XL5 | 0.01 |
| D-Silicate | 10.00 |
| Polytergent ® SLF-18 | 2.00 |
| STPP | 17.00 |
| NaOH | 0.70 |
| Water | q.s. 100 |

The stability of the encapsulated chlorine bleach in the automatic dishwashing detergent composition was observed as follows:

TABLE 12

| SAMPLE | 1 DAY | 5 DAYS | 7 DAYS | 14 DAYS |
|---|---|---|---|---|
| 1% CDB-56 ® at 22° C. | 0.35% | 0.22% | 0.16% | |
| Chlorine bleach capsules at 22° C. | | 71.67% | 64.39% | 44.69% |
| 1% CDB-56 ® at 35° C. | 0.00% | | | |
| Chlorine bleach capsules at 22° C. | | 51.49% | 49.44% | 9.71% |

It was observed that the chlorine bleach capsules having a coating of paraffin wax/petrolatum and silica were significantly more stable than the unencapsulated bleach. As observed for the capsule 4 type of Example 1, samples of paraffin wax and petrolatum which did not contain a structuring agent rapidly phase separated. Attempts to form the capsules were largely unsuccessful.

We claim:

1. A process for preparing wax capsules comprising the steps of:
   a) selecting a wax coating from a group consisting of petroleum wax, a natural wax, a synthetic wax and mixtures thereof.
   b) choosing 0.5 wt. % to about 8 wt. % of a structuring agent which is hydrophobic and readily mixable with the wax selected in step (a) at a temperature higher than a melting point of the wax, the structuring agent selected from the group consisting of a hydrophobic silica, an organophilic clay and a hydrocarbon material;
   c) heating the wax selected in step (a) and the structuring agent chosen in step (b) together at a temperature higher than the melting point of the wax to form a molten mixture;
   d) selecting an active material which is water soluble or water dispersible;
   e) dispersing the active material selected in step (d) into the molten mixture formed in step (c) with shear until a homogeneous molten mixture is formed to prevent phase separation of the active material from the homogeneous molten mixture and to maintain stability of the active material in the homogeneous molten mixture at a temperature higher than the melting point of the wax; and
   f) atomizing and cooling the homogeneous molten mixture to form wax capsules.

2. A process according to claim 1 wherein the selecting step (a) comprises selecting a paraffin wax or a mixture of paraffin wax and a petroleum wax as the wax.

3. A process according to claim 2 wherein the petroleum wax is petroleum and the ratio of petrolatum to the paraffin wax is selected in a range of about 20/80 to about 60/40.

4. A process according to claim 1 wherein the structuring agent chosen in step (b) is selected from the group consisting of a hydrophobic silica, an organophilic clay and a hydrocarbon material having a molecular weight of about 50,000 to about 5,000,000.

5. A process according to claim 1 wherein the heating of step (c) occurs at a temperature above 40° C.

6. A process according to claim 1 wherein the active material is selected from a group consisting of a nonionic surfactant, an anionic surfactant and mixtures thereof.

7. A process according to claim 6 wherein the nonionic surfactant is in a liquid form.

8. A process according to claim 7 wherein the nonionic surfactant has an HLB value of less than 10.

9. A process according to claim 1 wherein the wax capsules formed in step (f) have an average diameter of about 100 microns to about 3,000 microns.

* * * * *